US011972426B2

(12) United States Patent
Kumawat et al.

(10) Patent No.: US 11,972,426 B2
(45) Date of Patent: Apr. 30, 2024

(54) METHOD AND SYSTEM FOR USER AUTHENTICATION TO FACILITATE SECURE TRANSACTIONS

(71) Applicant: MASTERCARD INTERNATIONAL INCORPORATED, Purchase, NY (US)

(72) Inventors: Jaipal Singh Kumawat, Sikar (IN); Vipul Mehrotra, Sandila (IN); Hemant Arora, Gurugram (IN)

(73) Assignee: Mastercard International Incorporated, Purchase, NY (US)

( * ) Notice: Subject to any disclaimer, the term of this patent is extended or adjusted under 35 U.S.C. 154(b) by 751 days.

(21) Appl. No.: 16/033,391

(22) Filed: Jul. 12, 2018

(65) Prior Publication Data

US 2019/0019192 A1 Jan. 17, 2019

(30) Foreign Application Priority Data

Jul. 17, 2017 (SG) .......................... 10201705849W

(51) Int. Cl.
*G06Q 20/40* (2012.01)
*G06F 21/31* (2013.01)
*H04M 3/493* (2006.01)

(52) U.S. Cl.
CPC ......... *G06Q 20/4014* (2013.01); *G06F 21/31* (2013.01); *G06F 2221/2103* (2013.01); *H04M 3/4936* (2013.01)

(58) Field of Classification Search
CPC .............................................. G06Q 20/40145
See application file for complete search history.

(56) References Cited

U.S. PATENT DOCUMENTS

| 8,573,479 | B1 * | 11/2013 | Jenkins | G07F 19/201 |
| | | | | 235/375 |
| 10,891,688 | B1 * | 1/2021 | Clausen | G06F 3/0481 |
| 2005/0075985 | A1 * | 4/2005 | Cartmell | G06Q 20/04 |
| | | | | 705/67 |
| 2006/0256950 | A1 * | 11/2006 | Patel | H04M 3/493 |
| | | | | 379/265.02 |
| 2007/0228148 | A1 * | 10/2007 | Rable | G06Q 40/02 |
| | | | | 235/379 |
| 2009/0086936 | A1 * | 4/2009 | Clifford | G06Q 10/06398 |
| | | | | 379/88.13 |

(Continued)

*Primary Examiner* — Jay Huang
(74) *Attorney, Agent, or Firm* — Pramudji Law Group PLLC; Ari Pramudji

(57) ABSTRACT

A method for authenticating a user includes receiving an authorization request for a transaction from an account. A plurality of authentication questions each having a corresponding correct answer are associated with the account. A first set of authentication questions of the plurality of authentication questions is transmitted to a communication device by way of an interactive voice response (IVR) call. A first set of user-generated answers corresponding to the first set of authentication questions is received from the communication device. The method further includes determining whether the user is an account holder of the account based on at least the first set of user-generated answers. The transaction is processed based on the determination that the user is the account holder of the account, thereby authenticating the user.

17 Claims, 9 Drawing Sheets

(56) References Cited

U.S. PATENT DOCUMENTS

| | | | | |
|---|---|---|---|---|
| 2011/0092249 A1* | 4/2011 | Evanitsky | ......... | H04M 1/72481 |
| | | | | 455/556.1 |
| 2011/0184864 A1* | 7/2011 | Mon | .................... | G09B 21/003 |
| | | | | 705/43 |
| 2016/0344870 A1* | 11/2016 | Nair | .................... | H04M 3/5191 |
| 2018/0211267 A1* | 7/2018 | Gerard | ............... | G06Q 30/0205 |

* cited by examiner

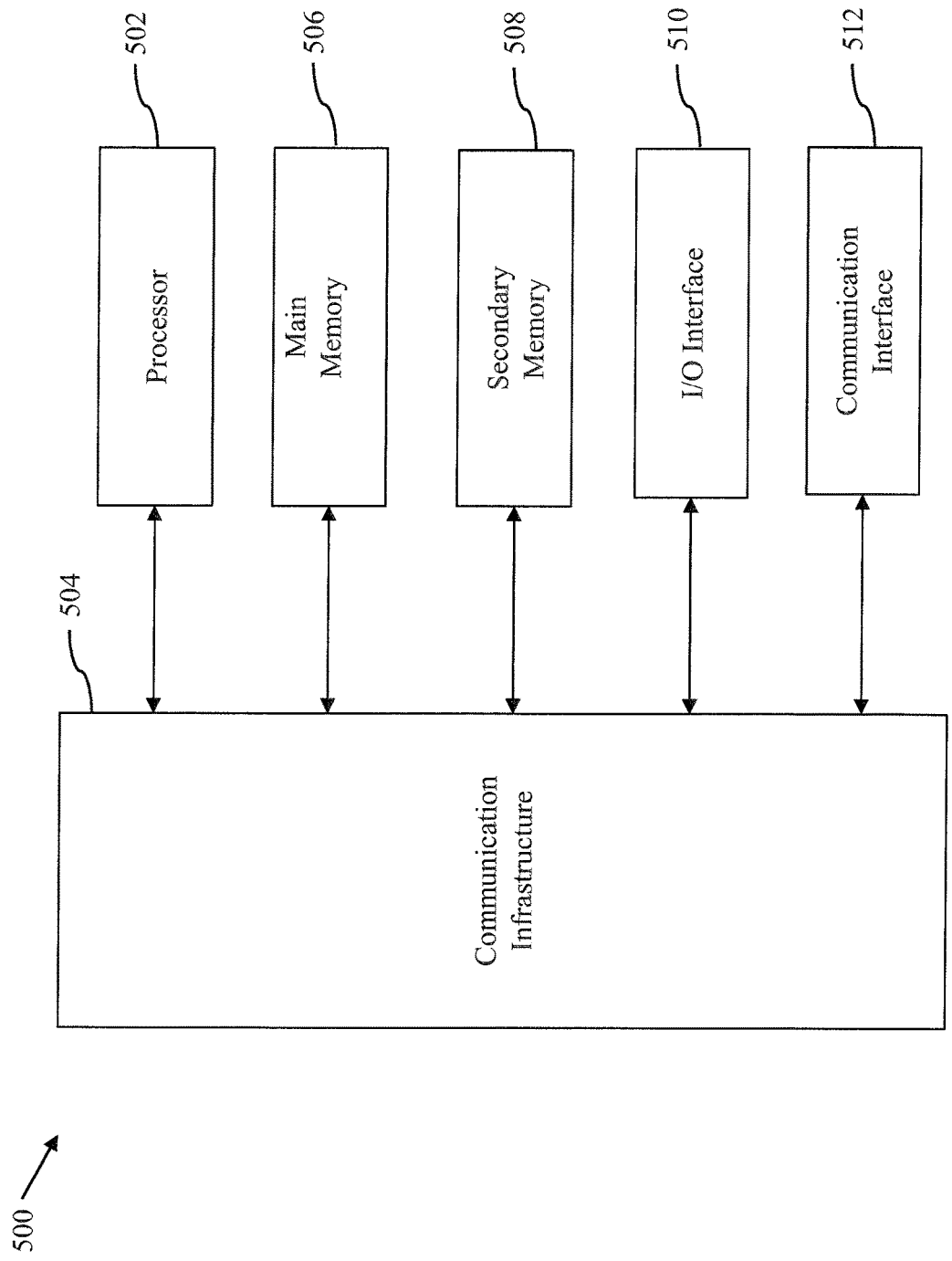

METHOD AND SYSTEM FOR USER AUTHENTICATION TO FACILITATE SECURE TRANSACTIONS

CROSS-REFERENCE TO RELATED APPLICATION

This application claims the benefit of and priority to Singapore Patent Application No. 10201705849 W filed Jul. 17, 2017. The entire disclosure of the above application is incorporated herein by reference.

FIELD

The present disclosure relates to a method and system of conducting secure transactions, and more particularly to a method and system for user authentication to facilitate secure transactions for visually impaired users.

BACKGROUND

This section provides background information related to the present disclosure which is not necessarily prior art.

Technological advancements have led to emergence and evolution of several payment platforms that enable users to perform transactions, such as cash deposits and withdrawals, credit transfers, purchase payments, and the like. The payment platforms include automated teller machines (ATMs), point of sale (POS) devices, and online payment gateways. For performing a transaction, users may use either account identification information, such as an account number and a password, or transaction cards, such as debit cards, credit cards, or gift cards. However, the user initiating the transaction may not be the actual account holder of the account, leading to a fraudulent transaction. Hence, to prevent fraudulent transactions, authentication of a user initiating the transaction is required.

Authentication is a process to verify the identity of a user. Several authentication methods that are deployed on existing payment platforms use secret passkeys, such as passwords, personal identification numbers (PINs), one-time-passwords (OTPs), and the like. In such implementations, an account is linked with a unique passkey that is only known to the account holder of the account. Therefore, when a user initiates a transaction from an account, the unique passkey linked to the account is required to complete the transaction. Various input mechanisms are available to users for providing the unique passkey. For example, for a transaction carried out using a web-browser, the user may enter a password or an OTP by using virtual keys displayed on the screen or by pressing keyboard keys. Similarly, the user may enter a PIN by pressing keys of an automated teller machine (ATM) for cash withdrawals.

The unique passkey based authentication methods rely on an assumption that only the account holder of the account knows the unique passkey. Therefore, the security of such authentication methods is compromised in an event someone who is not the account holder of an account fraudulently discovers the unique passkey linked to the account. For visually abled users, it is easier to ensure that no one discovers their unique passkey in comparison to visually impaired users. A visually abled user may ensure that no one was looking at the unique passkey when he or she entered the unique passkey into the ATM, whereas a visually impaired user would be unaware if someone discovers his or her unique passkey while it was entered in the ATM. Hence, the visually impaired users become easy targets for fraudulent discovery of the unique passkey. Further, it is very inconvenient for visually impaired users to provide the unique passkey by using the currently available input mechanisms, such as virtual keypads.

A known solution to overcome these problems is to use biometric authentication that utilizes biometric information, such as fingerprints, voiceprints, retina scans, and the like, to authenticate the visually impaired users for transactions. In one example, a biometric reader is installed at an ATM, such that for completing a transaction a user is required to provide the biometric information. The biometric reader may be a fingerprint scanner, an iris scanner, a face scanner, a voiceprint identifier, and the like. Thus, biometric authentication provides a means for performing secure transactions for the visually impaired users. However, for authentication systems utilizing biometric techniques, installation of additional hardware and software to existing payment platforms is required, which is not only a cumbersome process, but also increases the cost of the authentication systems. Further, some of the existing payment platforms may not be compatible for executing biometric authentication. Hence, it becomes inconvenient for the visually impaired users, as the feasible options to perform secured transactions are limited.

In light of the foregoing, there exists a need for a user authentication solution for carrying out transactions. The user authentication solution should be compatible with all the existing platforms, should enable the visually impaired users to perform secure transactions without any inconvenience, and should overcome the above-mentioned drawbacks of the existing solutions.

SUMMARY

This section provides a general summary of the disclosure, and is not a comprehensive disclosure of its full scope or all of its features. Aspects and embodiments of the disclosure are set out in the accompanying claims.

In an embodiment of the present disclosure, a method for authenticating a user is provided. A first server receives an authorization request for a transaction from a second server. The authorization request includes account identification information corresponding to an account. A plurality of authentication questions each having a corresponding correct answer are associated with the account. Each of the plurality of authentication questions is of Boolean type. The first server transmits a first set of authentication questions of the plurality of authentication questions to a communication device of the user, by way of an interactive voice response (IVR) call. The first server receives a first set of user-generated answers from the communication device and determines whether the user is an account holder of the account, based on at least the first set of user-generated answers. The first server processes the transaction based on the determination that the user is the account holder of the account, thereby authenticating the user.

In another embodiment of the present disclosure, a system for authenticating a user is provided. The system includes a first server that includes a memory and a processor that communicates with the memory. The memory is configured to store a plurality of authentication questions and a correct answer corresponding to each of the plurality of authentication questions. The plurality of authentication questions are associated with an account of an account holder. Each of the plurality of authentication questions is of Boolean type. The processor receives an authorization request for a transaction from a second server. The authorization request includes account identification information corresponding to the account. The processor transmits a first set of authentication questions of the plurality of authentication questions to a communication device by way of an interactive voice response (IVR) call. Further, the processor receives a first set of user-generated answers corresponding to the first set of authentication questions from the communication device. The processor determines whether the user is the account holder of the account, based on at least the first set of user-generated answers. Furthermore, the processor processes the transaction based on the determination that the user is the account holder of the account, thereby authenticating the user.

In another embodiment, a non-transitory computer readable medium comprising computer executable instructions which when executed by a computer cause the computer to perform a method for authenticating a user is provided. The method includes receiving an authorization request for a transaction from a server. The authorization request includes account identification information corresponding to an account. The plurality of authentication questions each having a corresponding correct answer are associated with the account. Each of the plurality of authentication questions is of Boolean type. A first set of authentication questions of the plurality of authentication questions is transmitted to a communication device by way of an interactive voice response (IVR) call. A first set of user-generated answers corresponding to the first set of authentication questions is received from the communication device. It is determined whether the user is an account holder of the account based on at least the first set of user-generated answers. The transaction is processed based on the determination that the user is the account holder of the account, thereby authenticating the user.

Various embodiments of the present disclosure provide a method and system for authenticating a visually impaired user who initiates a transaction. User authentication for such a transaction is based on details of an account holder of an account from which the transaction is initiated. A user initiates a transaction from an account by way of a computing device. A server associated with an issuer bank, where the account is maintained, receives an authorization request for the transaction. The authorization request includes account identification information of the account from which the transaction is initiated. The server determines whether an account holder of the account is visually impaired based on the account identification information. The server initiates an interactive voice response (IVR) call to perform an authentication attempt by transmitting a first set of authentication questions of a plurality of authentication questions to a communication device. The plurality of authentication questions are linked to the account and are of Boolean type. Further, each authentication question has a corresponding correct answer. The server initiates the IVR call on a registered contact number of the account holder. The server further receives a first set of user-generated answers provided by the user from the communication device. The server authenticates the user and processes the transaction when the authentication attempt is successful, i.e., when the first set of user-generated answers matches the correct answer corresponding to the first set of authentication questions. In an embodiment, the server may perform multiple authentication attempts, until a count of unsuccessful authentication attempts equals a threshold count. The server authenticates the user when at least one authentication attempt is successful and does not authenticate the user when all of the authentication attempts are unsuccessful. Thus, the server provides a secure means of performing transactions to a visually impaired person, as the transaction is secured by means of Boolean type authentication questions that are audibly transmitted to the user's registered contact number.

DRAWINGS

The drawings described herein are for illustrative purposes only of selected embodiments and not all possible implementations, and are not intended to limit the scope of the present disclosure. The accompanying drawings illustrate various embodiments of systems, methods, and other aspects of the disclosure. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the present disclosure are illustrated by way of example, and not limited by the appended figures, in which like references indicate similar elements, and in which.

Figure 1:
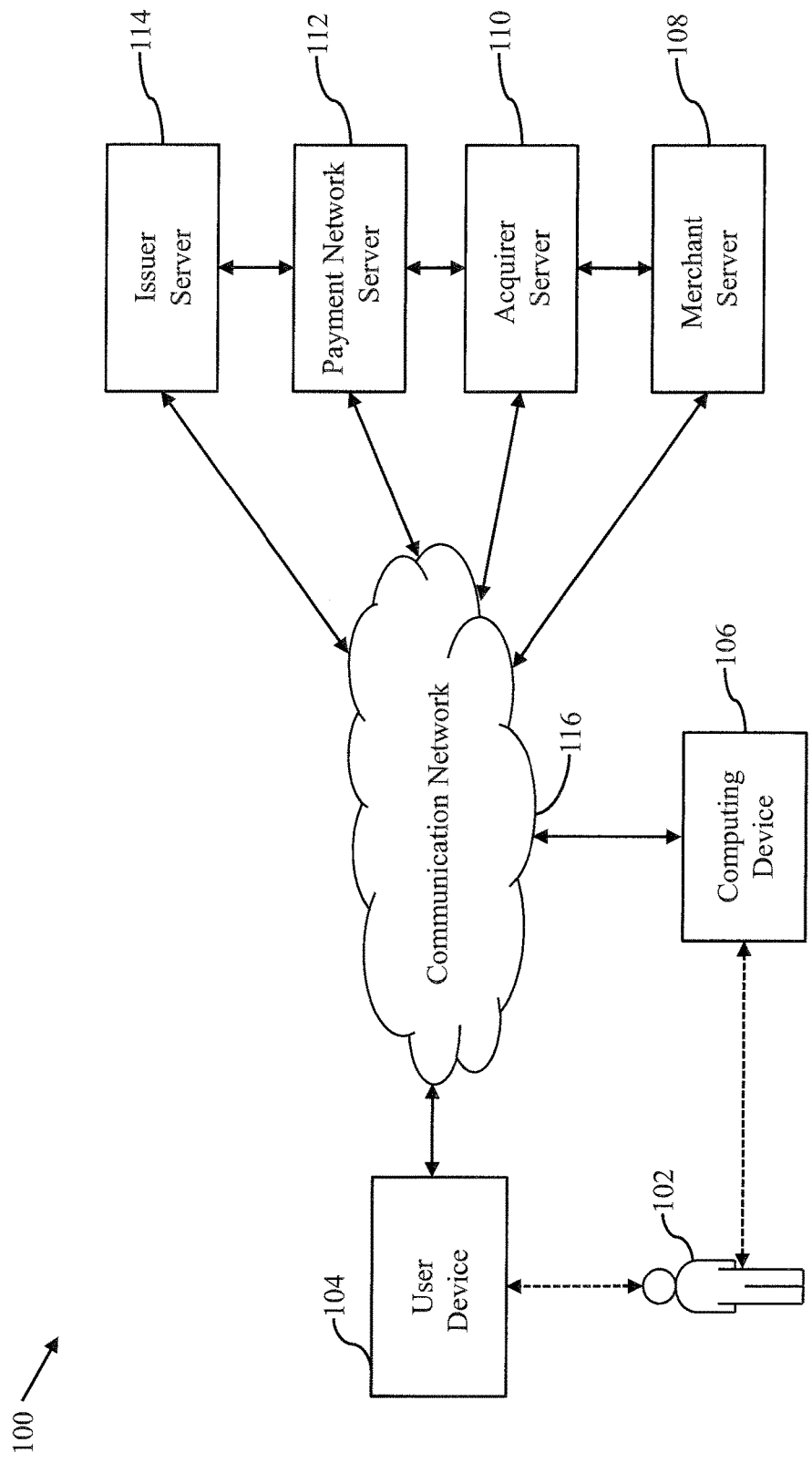
FIG. 1 is a block diagram that illustrates a communication system for facilitating secure transactions, in accordance with an embodiment of the present disclosure.
Figure 3A:
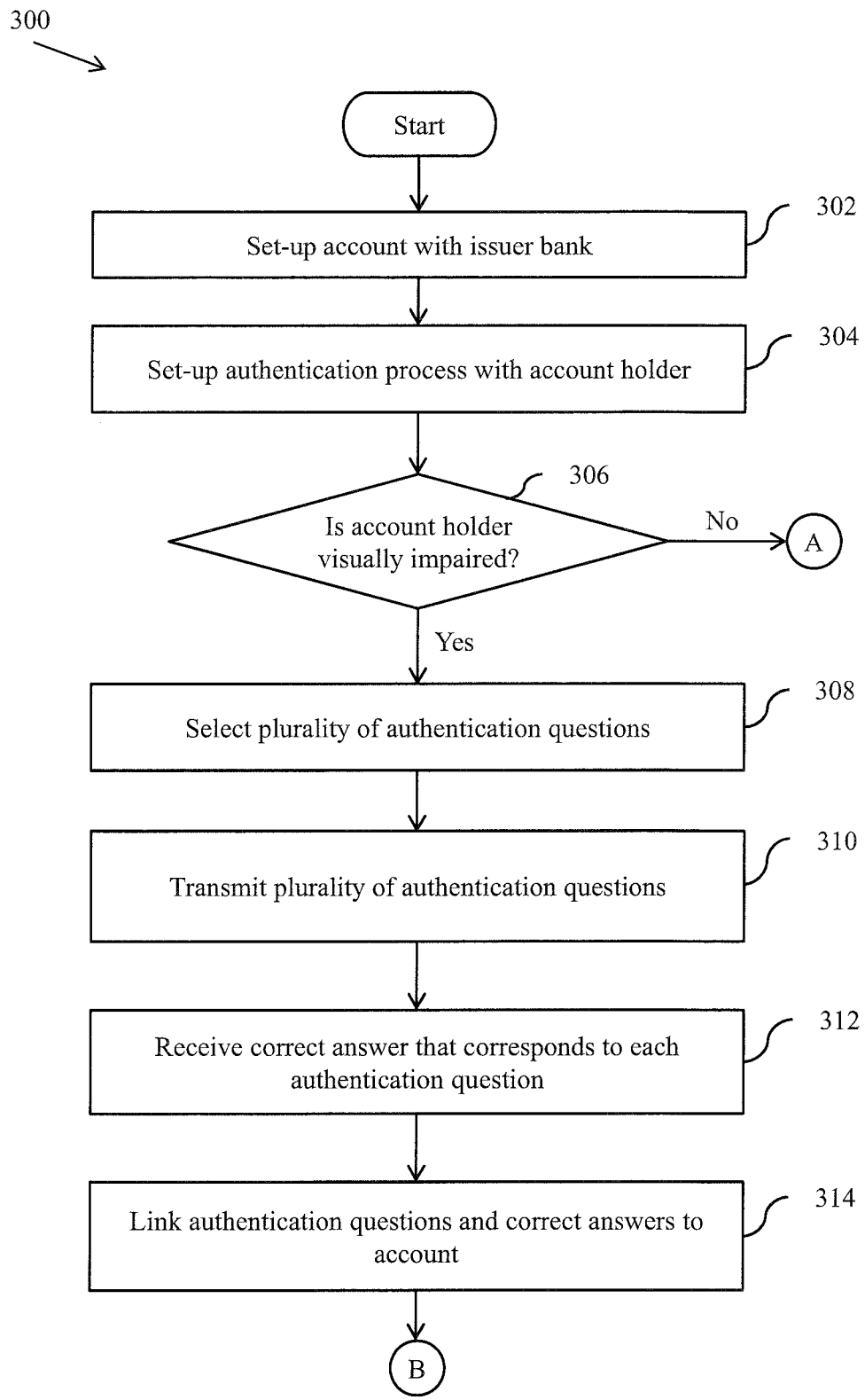
Figure 3B:
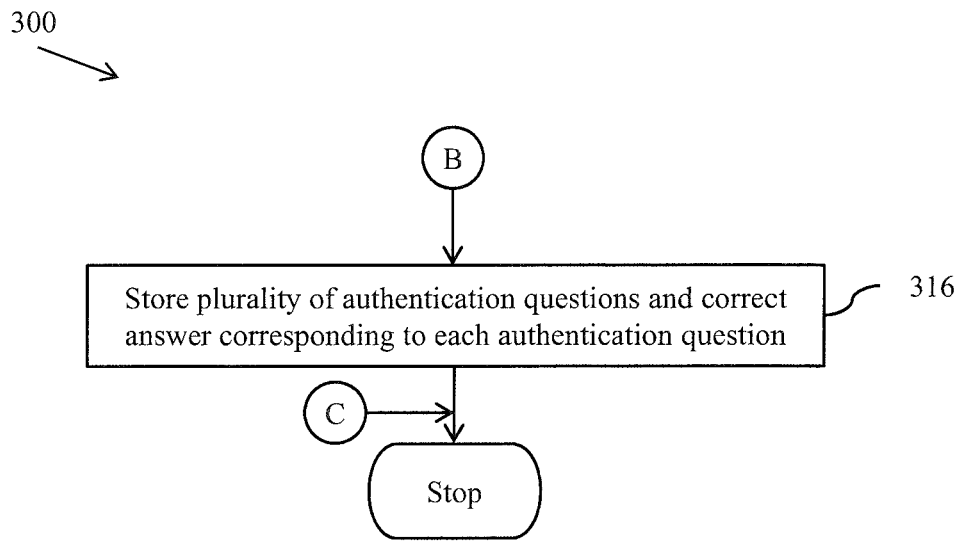
Figure 3C:
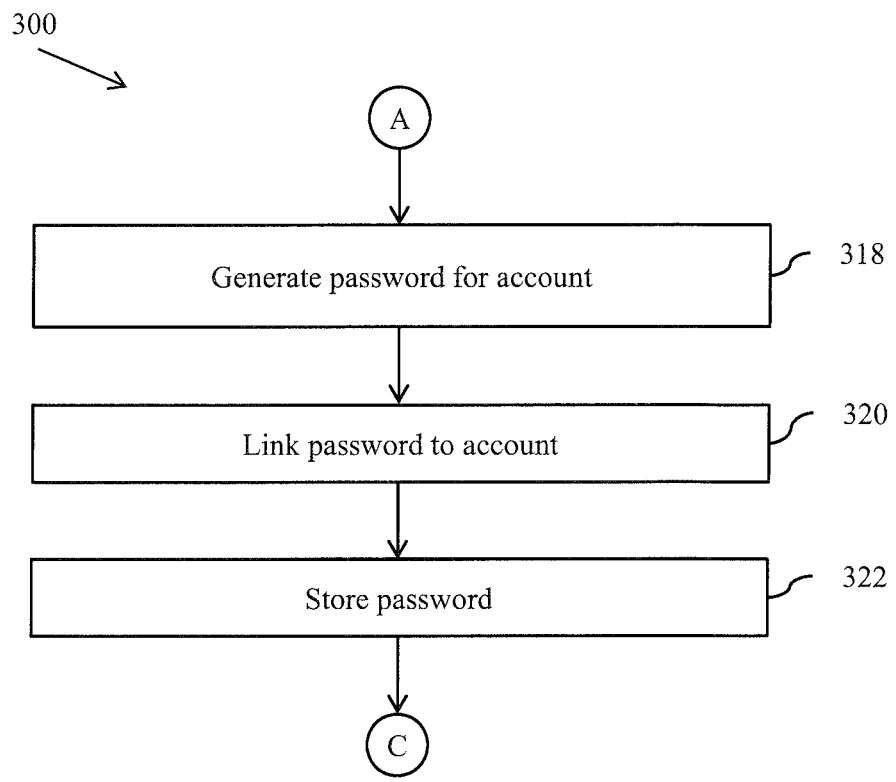
Figure 4A:
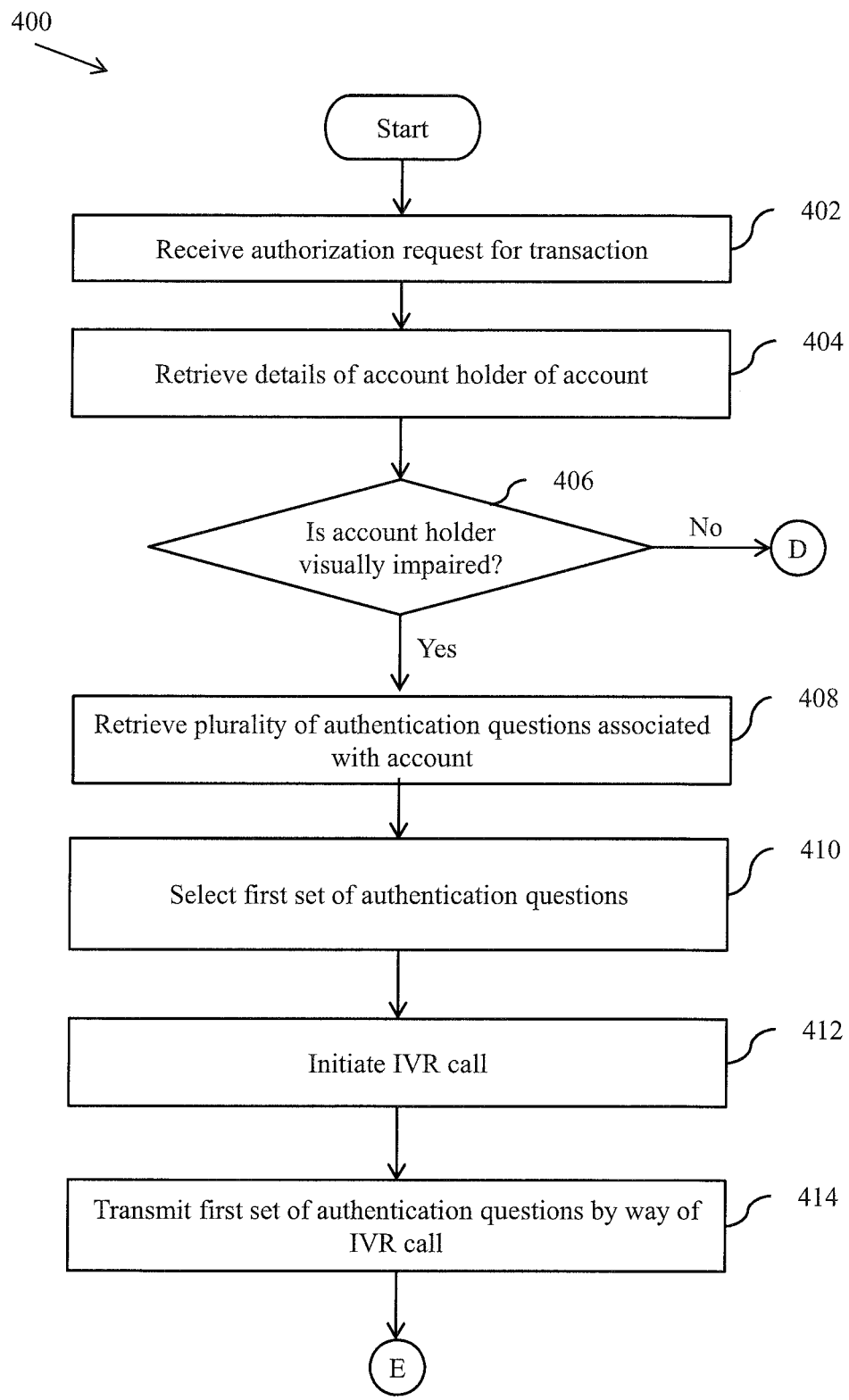
Figure 4B:
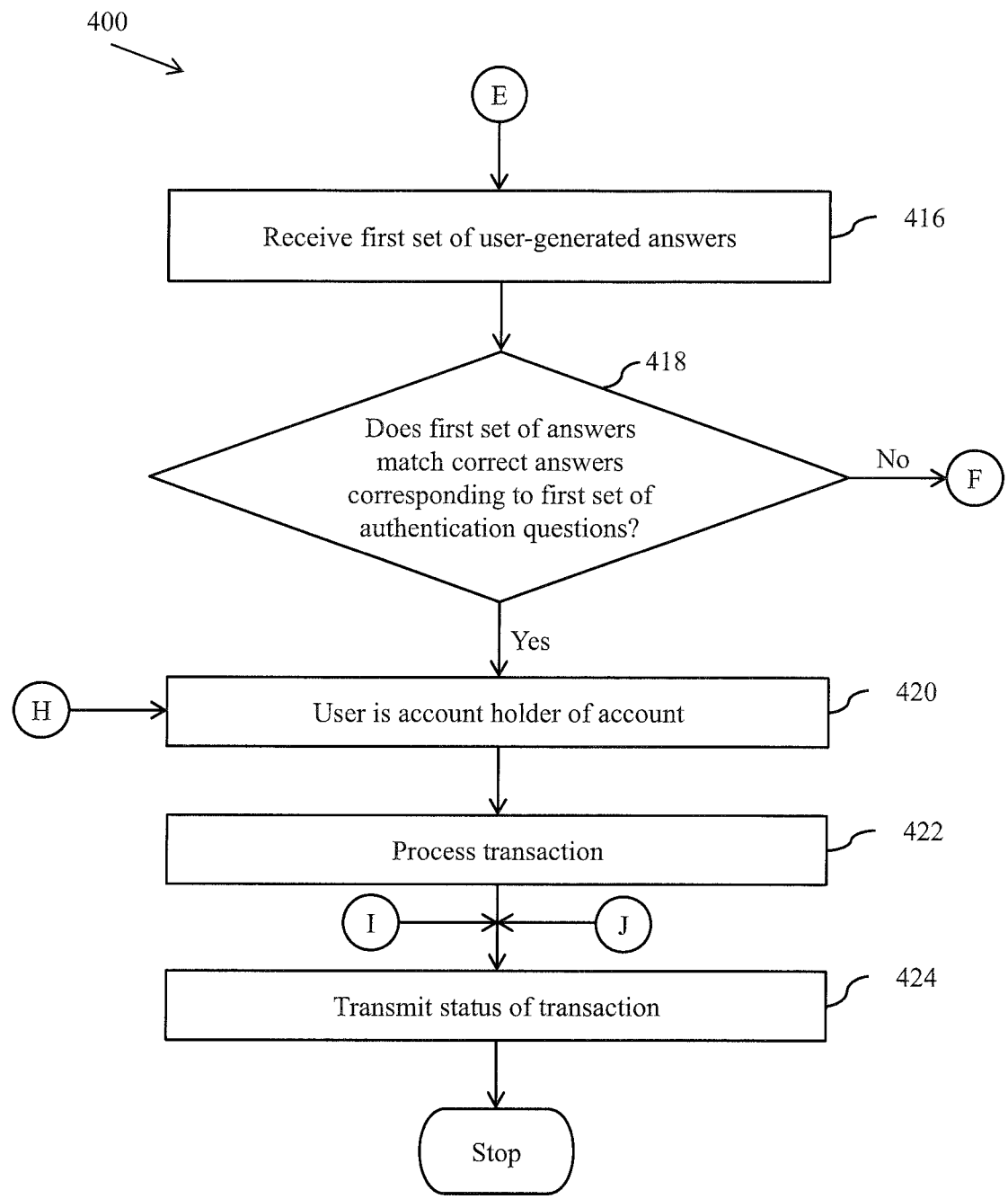
Figure 4C:
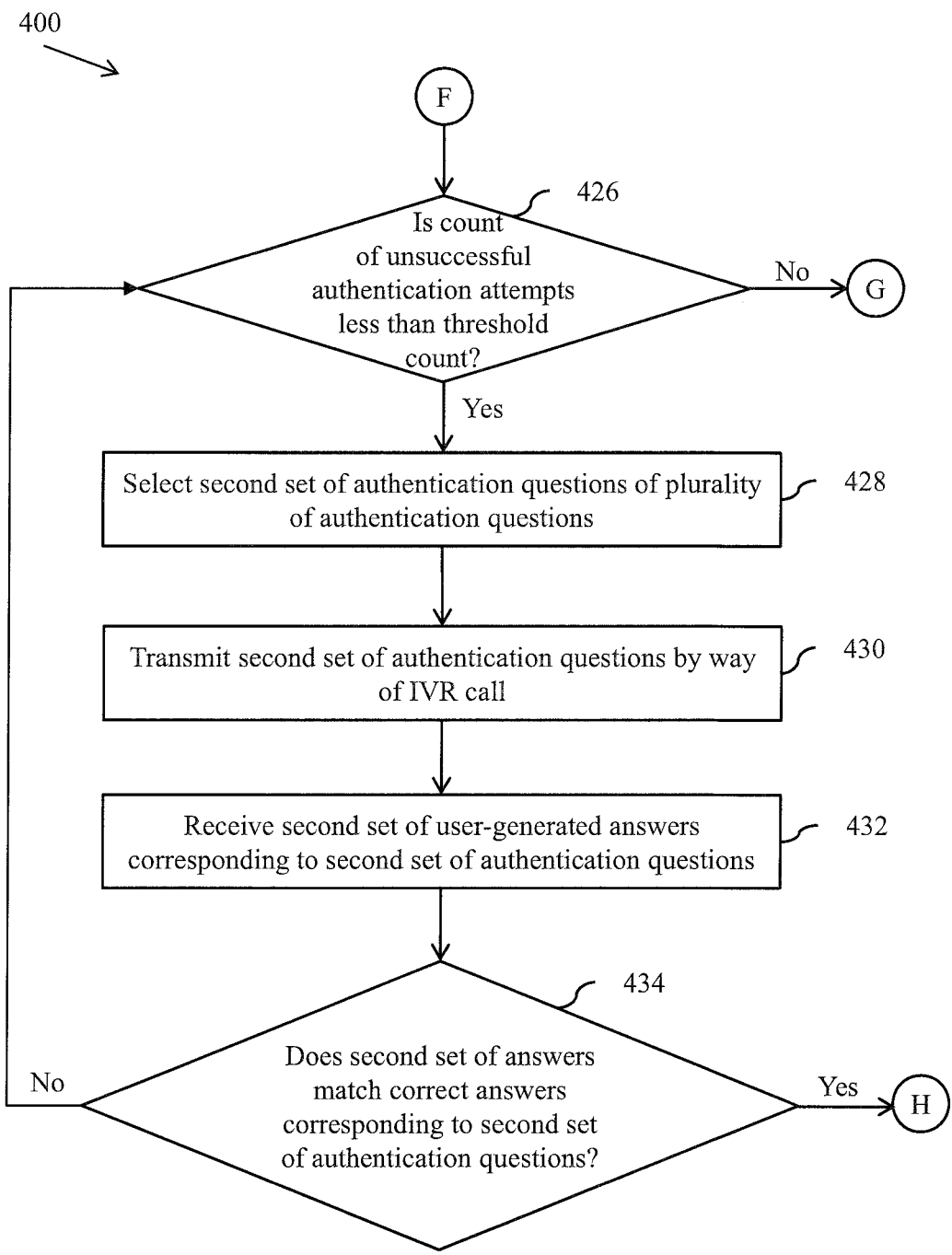
Figure 4D:
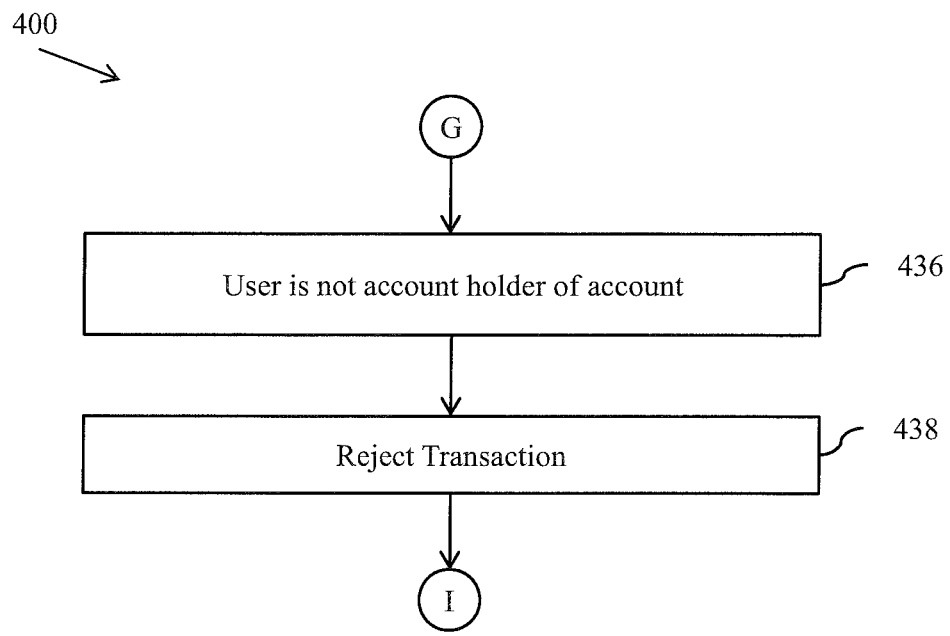
Figure 4E:
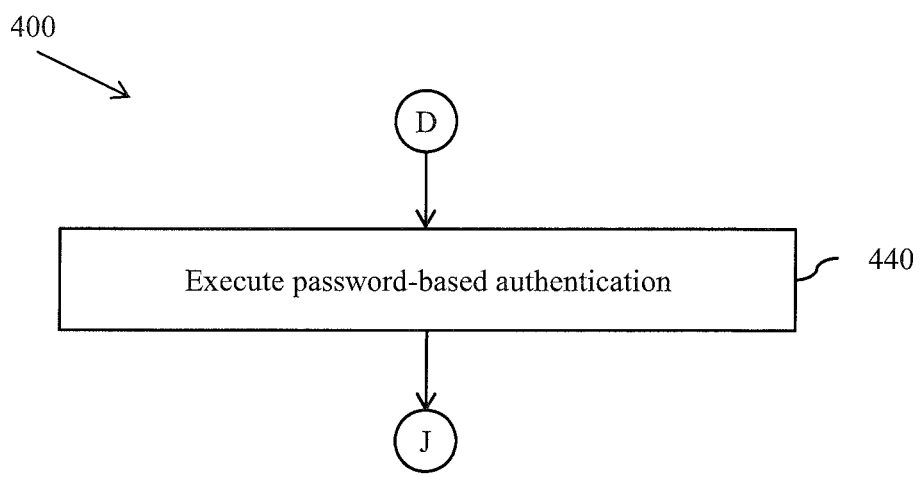

FIGS. 3A-3C collectively represent a flow chart that illustrates a method to set-up an authentication process for an account of an account holder using the communication system of FIG. 1, in accordance with an embodiment of the present disclosure;

FIGS. 4A-4E collectively represent a flow chart that illustrates a method for performing user authentication to conduct a secure transaction for the account holder using the communication system of FIG. 1, in accordance with an embodiment of the present disclosure; and FIG. 5 is a block diagram that illustrates system architecture of a computer system, in accordance with an embodiment of the present disclosure.

Further areas of applicability of the present disclosure will become apparent from the detailed description provided hereinafter. It should be understood that the detailed description of exemplary embodiments is intended for illustration purposes only and is, therefore, not intended to necessarily limit the scope of the present disclosure.

DETAILED DESCRIPTION

Embodiments of the present disclosure will be described, by way of example only, with reference to the drawings. The description and specific examples included herein are intended for purposes of illustration only and are not intended to limit the scope of the present disclosure.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

As used herein, the term "authentication" refers to a method for verifying the identity of a user. For example, authenticating a user who initiates a transaction from an account corresponds to an act of ensuring that the user is an actual account holder of the account and is authorized to perform transactions from the account.

As used herein, the terms "transaction cards", "financial cards", or "payment cards" refer to cards, such as debit cards, credit cards, prepaid cards, gift cards, promotional cards, and/or other devices, such as contactless fobs or payment-enabled mobile devices, that may hold identification information of an account. Transaction cards can be used to perform transactions, such as deposits and withdrawals, credit transfers, purchase payments, and the like. A transaction card may also be radio frequency identification (RFID) or near field communication (NFC) enabled for contactless payments.

As used herein, the terms "point-of-sale (POS) device", "point-of-interaction (POI) device", "point-of-purchase (POP) device", or "near field communication (NFC) POS device" refer to a computing device installed within retail establishments, such as merchant stores, for initiating transactions by use of transaction cards. In one embodiment, the POS device includes a card reader to read account identification information stored in a transaction card for communicating it to a merchant server. In an example, a user may insert, swipe, or tap a transaction card at a POS device to initiate a transaction. The card reader of the POS device reads the account identification information stored in the transaction card. In another embodiment, the POS device includes an input mechanism that enables the user to enter the account identification information for initiating the transaction.

As used herein, the term "automated teller machine (ATM)" refers to a computing device affiliated with a financial institution, such as a bank. The ATM enables a user to initiate various transactions, such as cash withdrawals, and the like. In one embodiment, the ATM includes a card reader to read account identification information stored in a transaction card used for initiating a transaction. In an example, a user may insert or swipe a debit card at an ATM to initiate a transaction. The card reader of the ATM reads the account identification information stored in the transaction card for communicating it to a financial institution, such as a bank. Account holders may further access their accounts by using their transaction cards at ATMs. For example, an account holder may use his or her credit card to check an account balance summary of the account linked to the credit card.

As used herein, the term "merchant" refers to an entity that offers various products and/or services in exchange of payments. The merchant may establish a merchant account with a financial institution, such as a bank (hereinafter "acquirer bank") to accept the payments from several users.

As used herein, the term "issuer bank" refers to a financial institution, such as a bank, where accounts of several users are established and maintained. The issuer bank ensures payment for authorized transactions in accordance with various payment network regulations and local legislation.

As used herein, the term "payment networks" refers to transaction card associations that act as intermediate entities between acquirer banks and issuer banks to authorize and fund transactions. Examples of various payment networks include Mastercard®, American Express®, VISA®, Discover®, Diners Club®, and the like. Payment networks settle transactions between various acquirer banks and issuer banks when transaction cards are used for initiating the transactions. The payment network ensures that a transaction card used by a user for initiating a transaction is authorized. In one example, a user may use a stolen debit card for initiating a transaction. In this scenario, the payment network may determine that the debit card is not authorized to initiate any transaction and thus may decline the transaction.

As used herein, the term "interactive voice response (IVR)" refers to an automated telephonic technology that enables an interaction between a computing device and a human by use of voice. For authenticating a user for performing a transaction, an IVR call is placed to a communication device of the user. The IVR call directs the user on how to proceed with the authentication process.

As used herein, the term "server" refers to a physical or cloud data processing system on which a server program runs. A server may be implemented in hardware or software, or a combination thereof. In one embodiment, the server is implemented as a computer program that is executed on programmable computers, such as personal computers, laptops, or a network of computer systems. The server may correspond to a merchant server, a payment gateway server, a digital wallet server, an acquirer server, a payment network server, or an issuer server.

Referring now to FIG. 1, a block diagram that illustrates a communication system 100 for facilitating secure transactions, in accordance with an embodiment of the present disclosure, is shown. The communication system 100 includes a user 102 in possession of a user device 104. The communication system 100 further includes a computing device 106, a merchant server 108, an acquirer server 110, a payment network server 112, and an issuer server 114. The user device 104 and the computing device 106 communicate with the merchant server 108, the acquirer server 110, the payment network server 112, and the issuer server 114 by way of a communication network 116.

The user 102 may be an individual who initiates a transaction from an account. Examples of the transaction include a product or service purchase, a credit purchase, a debit transaction, a fund transfer, an online purchase, an account withdrawal, and the like. In an embodiment, the user 102 may use a transaction card (not shown) linked to the account to initiate the transaction. The transaction card refers to a payment card, such as a credit card, a debit card, a membership card, a promotional card, a charge card, a prepaid card, or a gift card. In an embodiment, the transaction card may be a physical card. In another embodiment, the transaction card may be a virtual card or payment token that is stored electronically in a memory (not shown) of the user device 104. The transaction card includes identification information (hereinafter "account identification information") that corresponds to the account to which the transaction card is linked. The account identification information may include an account number, a unique card number, an expiry date, name of a person that holds the account (hereinafter "account holder"), a card security code, and the like. The transaction card is issued to the account holder by a financial institution, such as an issuer bank, where the account is maintained. In one scenario, the user 102 may be the account holder of the account and may be visually impaired. In another scenario, the user 102 may not be the account holder of the account. In yet another scenario, the user 102 may be the account holder of the account and may not be visually impaired.

The user device 104 is a communication device, such as a mobile phone, that belongs to the account holder. Further, the user device 104 may be associated with a unique identification number that is linked with the account. In one example, the unique identification number corresponds to a registered contact number, such as a mobile telephone number, of the account holder. The contact number may be registered at the time the account is set up with the issuer bank. Examples of the user device 104 include, but are not limited to, a mobile phone, a smartphone, a personal digital assistant (PDA), a tablet, a phablet, or any other portable communication device. In an embodiment, the user device 104 may be RFID or NFC enabled for contactless payments by using electronically stored account identification information.

The computing device 106 is an electronic device which the user 102 uses to initiate the transaction by entering the account identification information. In an embodiment, the computing device 106 reads the account identification information held by the transaction card, which is used to initiate the transaction. Examples of the computing device 106 include, but are not limited to, an ATM linked with a financial institution, such as a bank, a POS device, a POI device, or a POP device installed at a merchant store. In another embodiment, the computing device 106 receives the account identification information when the user 102 enters the details of the transaction card in the computing device 106. In one example, the computing device 106 may be the user device 104, a smart phone, a PDA, a tablet, a phablet, a personal computer, a laptop, or any other portable computing device that hosts an online payment gateway which the user 102 initiates an e-commerce transaction. The computing device 106 transmits details of the transaction to at least one of the merchant server 108, the acquirer server 110, the payment network server 112, and the issuer server 114, over the communication network 116. The details of the transaction include the account identification information, a transaction amount, a time and a date of the transaction, a card type, and the like.

The merchant server 108 is a computing server that is associated with a merchant (not shown). The merchant may establish a merchant account with a financial institution, such as the acquirer bank, to accept the payments for products and/or services. In an embodiment, the merchant server 108 is communicatively linked to the computing device 106 installed at the merchant store via the communication network 116. The merchant server 108 processes the transactions initiated at the computing device 106. In another embodiment, the merchant server 108 is communicatively linked to an online payment gateway used by the user 102 for e-commerce transactions via the communication network 116. Examples of the merchant server 108 include, but are not limited to, a computer, a laptop, a mini computer, a mainframe computer, any non-transient and tangible machine that can execute a machine-readable code, or a network of computer systems.

The acquirer server 110 is a computing server that is associated with the acquirer bank. The acquirer bank processes the transaction details of a transaction received from at least one of the computing device 106 and the merchant server 108 by using the acquirer server 110. The acquirer server 110 transmits an authorization request to a payment network or the issuer bank associated with the account from which the transaction is initiated at the computing device 106, via the communication network 116. The acquirer server 110 transmits the authorization request to determine whether the account holder has initiated the transaction and whether the account holder's available credit line or account balance covers the transaction amount. In an embodiment, the acquirer server 110 credits or debits the merchant account in the acquirer bank with the transaction amount if the issuer bank approves the transaction. Examples of the acquirer server 110 include, but are not limited to, a computer, a laptop, a mini computer, a mainframe computer, any non-transient and tangible machine that can execute a machine-readable code, or a network of computer systems.

The payment network server 112 is a computing server that is associated with a payment network of a transaction card. Examples of the payment networks include Mastercard®, American Express®, VISA®, Discover®, Diners Club®, and the like. The payment network server 112 routes the authorization request received from the acquirer server 110 to the issuer server 114. Examples of the payment network server 112 include, but are not limited to, a computer, a laptop, a mini computer, a mainframe computer, any non-transient and tangible machine that can execute a machine-readable code, or a network of computer systems.

The issuer server 114 is a computing server that is associated with the issuer bank. The issuer bank is a financial institute that manages accounts of multiple account holders. Account details of the accounts established with the issuer bank are stored as account profiles in a memory (not shown) or a database of the issuer server 114 or on a cloud server (not shown) associated with the issuer server 114. The account details of an account may include an account balance, credit line details, details of the account holder, transaction history of the account holder, account identification information, and the like. The details of the account holder may include name, age, gender, physical attributes, such as 'visually abled' or 'visually impaired', registered contact number, an alternate contact number, email ID, and the like, of the account holder. The issuer server 114 receives various authorization requests for various transactions from one or more entities, such as the computing device 106, the merchant server 108, the acquirer server 110, or the payment network server 112 over the communication network 116. The issuer server 114 further performs user authentication for various authorization requests and determines whether the user 102, who initiated the transaction from an account, is the account holder of the account. The issuer server 114 further sets up an authentication process for the accounts maintained with the issuer bank for performing the user authentication and processes the transactions for approval or rejection based on the user authentication.

Methods for processing the transactions via the issuer server 114 will be apparent to persons having skill in the art and may include processing a transaction via the traditional four-party system or three-party system. In one example, the issuer server 114 rejects a transaction if the user 102 who initiated the transaction from an account is not identified as the account holder or if the balance in the account is not sufficient to cover the transaction amount. In another example, the issuer server 114 approves a transaction if the user 102 who initiated the transaction from an account is identified as the account holder and the account balance of the account is sufficient to cover the transaction amount. Thus, the issuer server 114 debits or credits the account balance of the account holder by the transaction amount if the transaction is approved. Examples of the issuer server 114 include, but are not limited to, a computer, a laptop, a mini computer, a mainframe computer, any non-transient and tangible machine that can execute a machine-readable code, or a network of computer systems.

The communication network 116 is a medium through which content and messages are transmitted between various devices, such as the user device 104, the computing device 106, the merchant server 108, the acquirer server 110, the payment network server 112, and the issuer server 114. Examples of the communication network 116 include, but are not limited to, a Wi-Fi network, a light fidelity (Li-Fi) network, a local area network (LAN), a wide area network (WAN), a metropolitan area network (MAN), a satellite network, the internet, a fiber optic network, a coaxial cable network, an infrared network, a radio frequency (RF) network, or any combination thereof. Various devices in the communication system 100 may connect to the communication network 116 in accordance with various wired and wireless communication protocols, such as Transmission Control Protocol and Internet Protocol (TCP/IP), User Datagram Protocol (UDP), $2^{nd}$ Generation (2G), $3^{rd}$ Generation (3G), $4^{th}$ Generation (4G), long term evolution (LTE) communication protocols, or any combination thereof. The functioning of the elements of the communication system 100 is explained in conjunction with FIG. 2.

Figure 2:
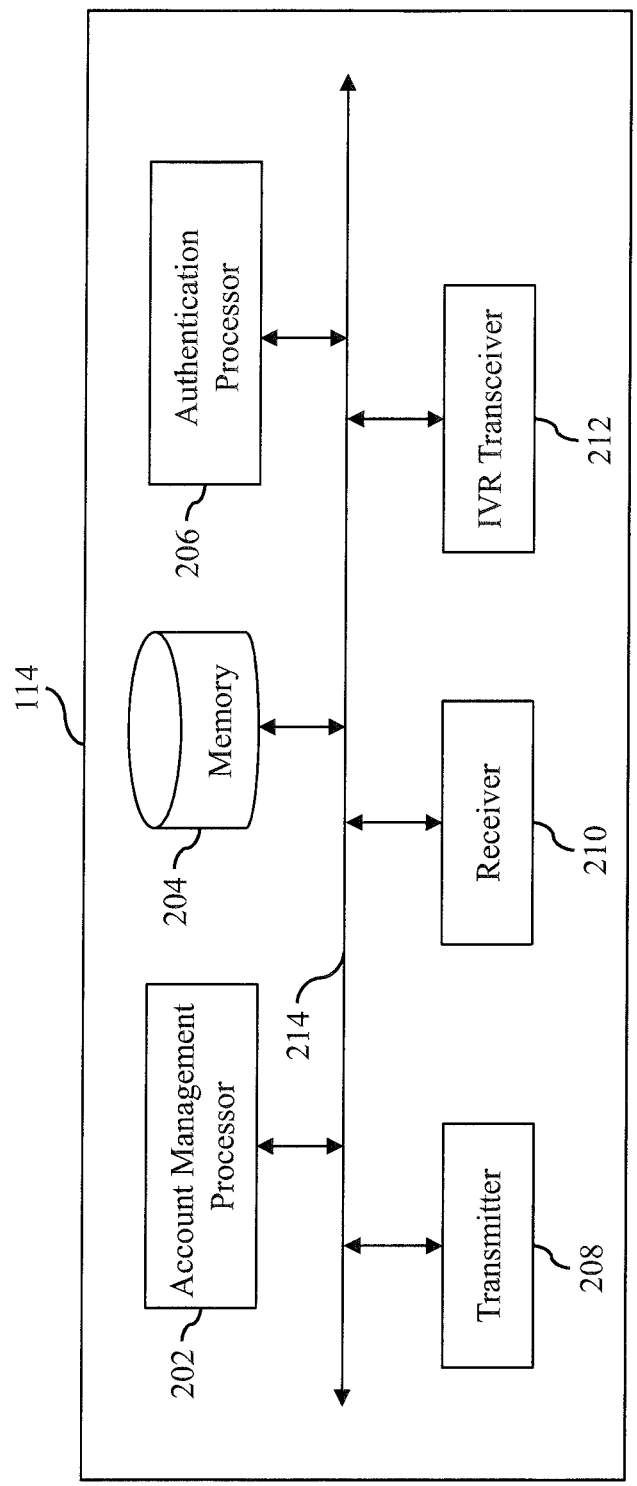
FIG. 2 is a block diagram that illustrates an issuer server of the communication system of FIG. 1, in accordance with an embodiment of the present disclosure.

Referring now to FIG. 2, a block diagram that illustrates the issuer server 114 of the communication system 100 of FIG. 1, in accordance with an embodiment of the present disclosure, is shown. The issuer server 114 includes an account management processor 202, a memory 204, an authentication processor 206, a transmitter 208, a receiver 210, and an IVR transceiver 212, that communicate with each other via a bus 214.

The account management processor 202 executes instructions stored in the memory 204. The account management processor 202 also sets up and maintains the accounts of various users that are set up with the issuer bank. For maintaining the accounts, the account management processor 202 updates an account profile linked to each account based on transactions corresponding to each account. Further, the account management processor 202 processes transactions from each account for approval or rejection based on the user authentication performed by the authentication processor 206. Examples of the account management processor 202 include an application-specific integrated circuit (ASIC) processor, a reduced instruction set computing (RISC) processor, a complex instruction set computing (CISC) processor, a field-programmable gate array (FPGA), and the like.

The memory 204 includes suitable logic, circuitry, and/or interfaces to store account profiles for the accounts that are established with the issuer bank. Each account profile includes information related to a corresponding account holder. The information of the account holder includes account identification information, account balance information, credit line information, details of transaction cards that are associated with the account, transaction history, and the like. The account identification information in the account profile of each account is unique and is used for identification of the corresponding account. In a scenario when the account holder of an account is visually impaired, the account profile further includes a set of authentication questions and corresponding correct answers linked to the account. The correct answers corresponding to the set of authentication questions are of Boolean type, i.e., the answers are stored in the form of "Yes" or "No", "True" or "False", or "1" or "0". Examples of the memory 204 include random access memory (RAM), read-only memory (ROM), a removable storage drive, a hard disk drive (HDD), and the like.

The authentication processor 206 executes operations related to the user authentication when an authorization request or a transaction request is received from one or more entities, such as the computing device 106, the merchant server 108, the acquirer server 110, or the payment network server 112. The authentication processor 206 sets-up the authentication process for each account, based on the details of the account holder. In an embodiment, the authentication processor 206 sets-up a different authentication process for an account holder who is visually impaired in comparison to an account holder who is visually abled. In one example, the authentication processor 206 sets-up the authentication process by using the set of authentication questions, when the account holder is visually impaired. In another example, the authentication processor 206 sets-up the authentication process by generating a personal identification number (PIN) and a customer ID for the account holder to perform transactions from the account, when the account holder is visually abled. The authentication processor 206 further communicates with the IVR transceiver 212 to initiate an IVR call when the account holder of the account from which a transaction is initiated is visually impaired. The authentication processor 206 communicates with the memory 204 via the bus 214 for retrieving the set of authentication questions linked to the account for authenticating the user 102. The authentication processor 206 further communicates the result of user authentication to the account management processor 202 for approving or rejecting the transactions. Examples of the authentication processor 206 include, but are not limited to, an ASIC processor, a RISC processor, and a CISC processor.

The transmitter 208 transmits data over the communication network 116 via one or more communication network protocols. The transmitter 208 transmits responses to various transaction and authorization requests to one or more entities, such as the computing device 106, the merchant server 108, the acquirer server 110, or the payment network server 112. In one example, the transmitter 208 transmits a response to the acquirer server 110 for an authorization request for a transaction. The response may correspond to approving or rejecting the transaction. Examples of the transmitter 208 include an antenna, a radio frequency transmitter, a wireless transmitter, a transceiver, and the like.

The receiver 210 receives data over the communication network 116 via one or more communication network protocols. The receiver 210 receives authorization requests or transaction requests from the computing device 106, the merchant server 108, the acquirer server 110, the payment network server 112, and other entities that are pursuant to one or more standards for the interchange of transaction messages, such as the ISO 8583 standard. The receiver 210 further receives account identification information for performing the transactions as well as any additional data suitable for performing the functions disclosed herein, such as data that may be used in the user authentication for a transaction. Examples of the receiver 210 include antenna, a radio frequency receiver, a wireless receiver, a transceiver, and the like.

The IVR transceiver 212 initiates an IVR call on a registered contact number, such as a mobile telephone number, of an account holder, who is visually impaired, via the communication network 116. In one example, the IVR transceiver 212 initiates the IVR call to the user device 104 associated with the registered contact number of the account holder. Once the IVR call is initiated, the IVR transceiver 212 transmits a set of authentication questions associated with the account of the account holder through an audio signal, i.e., the IVR call. Further, the IVR transceiver 212 receives a set of user-generated answers corresponding to the transmitted set of authentication questions from the user 102 via the user device 104. The IVR transceiver 212 further performs other interactive voice functions, such as transmitting a voice message indicating unsuccessful or successful transaction. Examples of the IVR transceiver 212 include an antenna, a radio frequency transmitter, a wireless transmitter, and the like, that are enabled to transmit audio signals.

To set-up the authentication process for the account holder who is visually impaired, the authentication processor 206 transmits a set of authentication questions through the IVR call on the registered contact number of the account holder. In an embodiment, the registered contact number is the contact number of the user device 104, such as a mobile or a landline telephone number. The IVR call is initiated by the IVR transceiver 212. In an embodiment, the authentication processor 206 selects the set of authentication questions based on personal details of the account holder, the transaction history of the account holder, and the like. In one example, the account holder was born in the month of September. Thus, the authentication processor 206 selects a question "Were you born in September?" based on personal details of the account holder. In another example, the account holder had booked travelling tickets to Singapore in May. Thus, the authentication processor 206 selects a question "Did you book travel tickets to Singapore in May?" based on the transaction history of the account holder. In some embodiments, the authentication processor 206 may select questions that have a negative answer. For example, the authentication processor 206 selects a question "Did you book travelling tickets to Singapore in March?" when it is known that the account holder did not book travelling tickets to Singapore in March. The set of authentication questions are unique for the account. The authentication processor 206 instructs the account holder through the IVR call to provide a correct answer for each authentication question. Based on the instructions received from the authentication processor 206, the account holder provides an answer to each authentication question. In one example, the account holder provides the correct answer to each authentication question vocally by saying either "yes" or "no", or "true" or "false" or "1" or "0" or by pressing "1" or "0" keys, which can be virtual or physical keys on the user device 104 during the IVR call. The IVR transceiver 212 receives the correct answer corresponding to each authentication question provided by the account holder.

The authentication processor 206 transmits the set of authentication questions one by one, i.e., the authentication processor 206 transmits a second authentication question only when it has received an answer to a first authentication question. Further, the authentication processor 206 stores each authentication question and the corresponding correct answer provided by the account holder in the memory 204. In addition, the authentication processor 206 links the set of authentication questions and their corresponding correct answers to the account of the account holder. In an embodiment, the authentication processor 206 allows the account holder to select the set of authentication questions from a default list of authentication questions that is audibly emitted through the user device 104. In another embodiment, the authentication processor 206 allows the account holder to select a set of authentication questions that are not included in the default list of authentication questions. Further, the authentication processor 206 may re-initiate the set-up of the authentication process after a fixed time-period, say 6 months. In addition, the authentication processor 206 lets the account holder perform multiple test-trials so that the account holder becomes accustomed to the authentication process.

In operation, the user 102, possessing the user device 104, initiates a transaction from a first account at the computing device 106. In one example, the user 102 may initiate the transaction by using a transaction card, i.e., a virtual card or a physical card at the computing device 106. In another example, the user 102 may initiate the transaction by manually entering the account identification information of the first account into the computing device 106. In yet another example, the user 102 may initiate the transaction by utilizing the electronically stored account identification information in the user device 104. The transaction card and the first account belong to a first account holder who is visually impaired. The user device 104 is linked to the registered contact number that corresponds to the first account.

The computing device 106 transmits the transaction details, which includes the account identification information, to the merchant server 108 or the acquirer server 110, via the communication network 116. In one example, the computing device 106, which corresponds to a POS device or a device hosting an online payment gateway for e-commerce transaction, transmits the transaction details to the merchant server 108. The merchant server 108 may further transmit the transaction details to the acquirer server 110 via the communication network 116. In another example, the computing device 106, which corresponds to an ATM or any other device under the direct hold of the acquirer bank, transmits the transaction details to the acquirer server 110. In an embodiment, when the user 102 initiates the transaction by using the transaction card linked to the first account, the acquirer server 110 transmits an authorization request including the transaction details to the issuer server 114 through the payment network server 112. The payment network server 112 authorizes the transaction card. In another embodiment, when the user 102 initiates the transaction without the use of the physical or virtual transaction card linked to the first account, the acquirer server 110 directly transmits the authorization request including the transaction details to the issuer server 114. The acquirer server 110 transmits the authorization request for the transaction to determine whether the first account holder, who is a legitimate account holder of the first account, has initiated the transaction and whether the first account holder's available credit line or account balance covers the transaction amount.

The authentication processor 206 retrieves the details of the first account holder of the first account from the memory 204, or a cloud server (not shown), when it receives the authorization request for the transaction. Based on the details of the first account holder, the authentication processor 206 determines that the first account holder is visually impaired and initiates a first authentication attempt. Further, the authentication processor 206 retrieves a first set of authentication questions of the set of authentication questions linked to the first account from the memory 204. In one example, the first set of authentication questions includes three questions. Further, the authentication processor 206 transmits the first set of authentication questions to the user device 104 linked to the registered contact number by way of the IVR call.

The user device 104 receives the IVR call during which the first set of authentication questions is audibly emitted to the user 102. The user 102 possessing the user device 104 provides an answer to each authentication question either by pressing "1" or "0", or by speaking "1" or "0", or "yes" or "no" or, "true" or "false". In one example, the authentication processor 206 instructs the IVR transceiver 212 to transmit a first authentication question in the first set of authentication questions. When the user 102 provides a first answer to the first authentication question, the first answer is transmitted by way of the IVR call to the IVR transceiver 212. The IVR transceiver 212 further communicates the first answer to the authentication processor 206. Similarly, the authentication processor 206 transmits a second authentication question and when the user 102 provides a second answer to the second authentication question, the authentication processor 206 transmits a third authentication question. The authentication processor 206 further receives a third answer provided by the user 102. Each authentication question has a predefined time-period after which the first through third authentication questions expire. In an embodiment, the authentication processor 206 temporarily stores the first through third answers, i.e., a first set of user-generated answers, in a cache memory (not shown). The authentication processor 206 further compares the first set of user-generated answers with the correct answers corresponding to the first set of authentication questions that are stored in the memory 204.

The first authentication attempt is successful when each answer in the first set of user-generated answers matches the correct answer corresponding to each authentication question. When the first authentication attempt is successful, the authentication processor 206 determines that the user 102 is the first account holder of the first account and authenticates the user 102. Further, the authentication processor 206 communicates to the account management processor 202 to process the transaction. The account management processor 202 further determines whether the available credit line or account balance of the first account covers the transaction amount. If the available credit line or the account balance of the first account covers the transaction amount, the account management processor 202 processes the transaction for approval such that the first account is debited or credited by the transaction amount. The account management processor 202 processes the transaction in accordance with various payment network regulations and local legislations.

The first authentication attempt is unsuccessful when there is a mismatch between at least one answer in the first set of user-generated answers and the correct answers corresponding to the first set of authentication questions. In addition, the authentication processor 206 considers an authentication question in the first set of authentication questions as incorrectly answered, if the user 102 does not provide an answer during the predefined time-period. The authentication processor 206 further transmits a notification regarding incorrect answers to the user device 104 by way of the IVR call. The authentication processor 206 further increments a counter, which is initially set to zero, by one when there is an unsuccessful authentication attempt. Thus, the counter holds the value "1" after the first authentication attempt is unsuccessful. The authentication processor 206 further determines if the count of unsuccessful authentication attempts is less than a threshold count. In one example, the threshold count is set at three. When the count of unsuccessful authentication attempts is less than the threshold count, i.e., three, the authentication processor 206 communicates to the IVR transceiver 212 to transmit a second set of authentication questions of the set of authentication questions to the user device 104 through the IVR call. The second set of authentication questions is different from the first set of authentication questions. The transmission of the second set of authentication questions to the user device 104 corresponds to a second authentication attempt. The IVR transceiver 212 receives a second set of user-generated answers corresponding to the second set of authentication questions provided by the user 102 through the IVR call. The authentication processor 206 determines whether the second authentication attempt corresponds to a successful authentication attempt or an unsuccessful authentication attempt. In an event of a successful authentication attempt, the authentication processor 206 authenticates the user 102. In an event of an unsuccessful authentication attempt, the authentication processor 206 communicates with the IVR transceiver 212 to transmit a third set of authentication questions of the set of authentication questions to the user device 104 and increments the counter by one. The counter now holds the value "2". The third set of authentication questions is different from the first and second set of authentication questions. The user 102 provides a third set of user-generated answers corresponding to the third set of authentication questions. Thus, the authentication processor 206 authenticates the user 102 when the third set of user-generated answers matches correct answers corresponding to the third set of authentication questions.

The authentication processor 206 increments the counter by one, when the third set of user-generated answers do not match the corresponding correct answers. The counter now holds the value "3". The authentication processor 206 determines that the user 102 is not the first account holder, when the value in the counter equals the threshold count. Further, the authentication processor 206 rejects the transaction and communicates the rejection of the transaction to the account management processor 202. The authentication processor 206 transmits a notification to the user device 104 for informing the user 102 that the transaction is rejected. The account management processor 202 further transmits a voice message on an alternate contact number of the first account holder to inform the user 102 regarding the rejection of the transaction by way of the transmitter 208. Further, the account management processor 202 may block the transaction card or lock the first account based on instructions received from the first account holder.

Thus, the communication system 100 provides a secure means to account holders, who are visually impaired, for performing transactions by way of Boolean type authentication questions. As the user device 104 transmits the authentication questions, there is no provision for a second person to see or listen to the authentication questions. Further, the authentication questions have Boolean type answers. Thus, in an event that an unauthorized person listens to the answers, the unauthorized person will not be able to use the answers for conducting fraudulent transactions. In addition, the order of authentication questions is not the same for every authentication attempt and any random set of authentication questions may be selected for each authentication attempt, thereby enhancing the security of the authentication process. The communication system 100 also has a provision of transmitting voice messages to the visually impaired account holders for informing the user 102 the unsuccessful authentication attempts in real time and further allows the visually impaired account holders to lock the account at an attempt of a rejected transaction. Thus, the user authentication based on Boolean type authentication questions that are transmitted through the IVR call is very convenient for an account holder who is visually impaired since the account holder does not need to remember any password or rely on any hardware for additional security. The communication system 100 reduces the likelihood of error caused by human intervention in comparison when a customer care executive in a call center environment performs the user authentication. The communication system 100 does not require installation of any additional hardware and hence can be implemented on currently available infrastructures.

A person skilled in the art will understand that the security of the authentication process as disclosed herein may be further enhanced by use of one or more other authentication methods and systems, such as voice recognition, and the like. Further, the functionalities of the account management processor 202 and the authentication processor 206 can be integrated into a single processor, without departing from the scope of the disclosure. It will be understood by a person skilled in the art that the first account holder and the merchant may have the first account and the merchant account in a same financial institution, respectively. Therefore, in such a case the issuer bank and the acquirer bank are the same.

Referring now to FIGS. 3A-3C, a flow chart 300 that illustrates a method to set-up an authentication process for an account of an account holder using the communication system 100 of FIG. 1, in accordance with an embodiment of the present disclosure, is shown. At step 302, the account management processor 202 sets-up an account of an account holder with the issuer bank. Thus, the account management processor 202 stores the details of the account holder as an account profile in the memory 204. At step 304, the authentication processor 206 sets-up the authentication process with the account holder. The authentication processor 206 retrieves the details of the account holder of the account that is set-up in the issuer bank. At step 306, the authentication processor 206 determines whether the account holder is visually impaired by using the details of the account holder. If at step 306, it is determined that the account holder is visually impaired, step 308 is performed.

At step 308, the authentication processor 206 selects a set of authentication questions, i.e., a plurality of authentication questions, based on personal details of the account holder, the transaction history of the account holder, and the like. At step 310, the authentication processor 206 transmits the set of authentication questions, i.e., the plurality of authentication questions, on the registered contact number of the account holder of the account by way of an IVR call. At step 312, the authentication processor 206 receives the correct answers corresponding to each authentication question. At step 314, the authentication processor 206 links the set of authentication questions, i.e., the plurality of authentication questions, and the correct answers corresponding to each authentication question to the account. At step 316, the authentication processor 206 stores the set of authentication questions, i.e., the plurality of authentication questions, and the correct answers corresponding to each authentication question in the memory 204.

If at step 306, it is determined that the account holder is not visually impaired, step 318 is performed. At step 318, the authentication processor 206 generates a password for the account. At step 320, the authentication processor 206 links the password with the account. At step 322, the authentication processor 206 stores the password in the memory 204. It will be apparent to a person skilled in the art that the authentication processor 206 may use other authentication methods known in the art to set up the authentication process when the account holder is not visually impaired.

Referring now to FIGS. 4A-4E, a flow chart 400 that illustrates a method for performing user authentication to conduct a secure transaction for an account holder, using the communication system 100 of FIG. 1, is shown. At step 402, the authentication processor 206 receives an authorization request for a transaction that is initiated by the user 102 by way of the user device 104 or the computing device 106. The authorization request includes account identification information of an account. At step 404, the authentication processor 206 uses the account identification information to retrieve details of the account holder of the account from the memory 204. At step 406, the authentication processor 206 performs a check to determine whether the account holder is visually impaired. If at step 406, it is determined that the account holder is visually impaired, step 408 is performed.

At step 408, the authentication processor 206 retrieves the set of authentication questions, i.e., the plurality of authentication questions, associated with the account from the memory 204. At step 410, the authentication processor 206 selects a first set of authentication questions of the set of authentication questions, i.e., the plurality of authentication questions. At step 412, the authentication processor 206 initiates the IVR call by way of the IVR transceiver 212 on the registered contact number of the account holder. At step 414, the authentication processor 206 transmits the first set of authentication questions by way of the IVR call. At step 416, the authentication processor 206 receives a first set of user-generated answers corresponding to the first set of authentication questions, which are provided by the user 102.

At step 418, the authentication processor 206 determines whether the first set of user-generated answers matches the correct answers corresponding to the first set of authentication questions. If at step 418, it is determined that the first set of user-generated answers matches the correct answers, step 420 is executed. At step 420, the authentication processor 206 determines that the user 102 is the account holder of the account, i.e., the authentication processor 206 authenticates the user 102. At step 422, the account management processor 202 processes the transaction. At step 424, the account management processor 202 further transmits a status of the transaction as "approved" to the computing device 106 and/or the user device 104.

If at step 418, it is determined that the first set of user-generated answers do not match the correct answers, step 426 is executed. At step 426, the authentication processor 206 determines whether the count of unsuccessful authentication attempts is less than the threshold count. If at step 426, it is determined that the count of unsuccessful authentication attempts is less than the threshold count, step 428 is executed. At step 428, the authentication processor 206 selects a second set of authentication questions of the set of authentication questions, i.e., the plurality of authentication questions. The second set of authentication questions is different from the first set of authentication questions. At step 430, the authentication processor 206 transmits the second set of authentication questions by way of the IVR call to the user device 104.

At step 432, the authentication processor 206 receives a second set of user-generated answers corresponding to the second set of authentication questions from the user device 104. The user 102 provides the second set of user-generated answers. At step 434, the authentication processor 206 determines whether the second set of user-generated answers matches the correct answers corresponding to the second set of authentication questions. If at step 434, it is determined that the second set of user-generated answers matches the correct answers corresponding to the second set of authentication questions, step 420 is executed. However, if at step 434, it is determined that the second set of user-generated answers do not match the correct answers corresponding to the second set of authentication questions, step 426 is executed. If at step 426, it is determined that count of unsuccessful authentication attempts is not less than the threshold count, step 436 is executed.

At step 436, the authentication processor 206 determines that the user 102 is not the account holder of the account and does not authenticate the user 102. At step 438, the account management processor 202 rejects the transaction based on the result of user authentication and step 424 is executed. The account management processor 202 transmits the status of the transaction as "rejected" to the computing device 106 and/or the user device 104.

If at step 406, it is determined that the account holder is not visually impaired, steps 440 and 424 are performed. At step 440, the authentication processor 206 executes password-based authentication. Further, the account management processor 202 may process the transaction based on the result of the password-based authentication. At step 424, the account management processor 202 may transmit the status of the transaction as "approved" or "rejected" to the computing device 106 and/or the user device 104 based on the result of password-based authentication. It will be apparent to a person skilled in the art that the authentication processor 206 may use any authentication technique known in the art to authenticate the user 102 when the account holder is not visually impaired.

Referring now to FIG. 5, a block diagram that illustrates system architecture of a computer system 500, in accordance with an embodiment of the present disclosure, is shown. An embodiment of the present disclosure, or portions thereof, may be implemented as computer readable code on the computer system 500. In one example, the user device 104, the computing device 106, the merchant server 108, the acquirer server 110, the payment network server 112, and the issuer server 114 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3A-3C and FIGS. 4A-4E.

The computer system 500 includes a processor 502 that may be a special purpose or a general purpose processing device. The processor 502 may be a single processor, multiple processors, or combinations thereof. The processor 502 may have one or more processor "cores." In one example, the processor 502 is an octa-core processor. Further, the processor 502 may be connected to a communication infrastructure 504, such as a bus, message queue, the communication network 116, multi-core message-passing scheme, and the like. The computer system 500 further includes a main memory 506 and a secondary memory 508. Examples of the main memory 506 may include RAM, ROM, dynamic RAM (DRAM), and the like. The secondary memory 508 may include a hard disk drive or a removable storage drive, such as a floppy disk drive, a magnetic tape drive, a compact disc, an optical disk drive, a flash memory, and the like. Further, the removable storage drive may read from and/or write to a removable storage device in a manner known in the art. In one example, if the removable storage drive is a compact disc drive, the removable storage device may be a compact disc. In an embodiment, the removable storage unit may be a non-transitory computer readable recording media.

The computer system 500 further includes an input/output (I/O) interface 510 and a communication interface 512. The I/O interface 510 includes various input and output devices that are configured to communicate with the processor 502. Examples of the input devices may include a keyboard, a mouse, a joystick, a touchscreen, a microphone, and the like. Examples, of the output devices may include a display screen, a speaker, headphones, and the like. The communication interface 512 may allow data to be transferred between the computer system 500 and various devices that are communicatively coupled to the computer system 500. Exemplary communication interfaces 512 may include a modem, a network interface, i.e., an Ethernet card, a communications port, and the like. Data transferred via the communication interface 512 corresponds to signals, such as electronic, electromagnetic, optical, or other signals as will be apparent to a person skilled in the art. The signals may travel via a communications channel (not shown) which transmits the signals to devices that are communicatively coupled to the computer system 500. Examples of the communications channel include, but are not limited to, cable, fiber optics, a phone line, a cellular phone link, or a radio frequency link.

Computer program medium and computer usable medium may refer to a non-transitory computer readable medium, such as the main memory 506 and the secondary memory 508, which may be a semiconductor memory, such as a DRAM. The computer program medium may provide data that enables the computer system 500 to implement the methods illustrated in FIGS. 3A-3C and FIGS. 4A-4E. In an embodiment, the present disclosure is implemented using a computer implemented application, the computer implemented application may be stored in a computer program product and loaded into the computer system 500 using the removable storage drive or the hard disc drive in the secondary memory 508, the I/O interface 510, or the communication interface 512.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor, such as the processor 502, and a memory, such as the main memory 506, and the secondary memory 508 implements the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Techniques consistent with the present disclosure provide, among other features, systems and methods for authenticating a user for performing secure transactions. While various exemplary embodiments of the disclosed system and method have been described above it should be understood that they have been presented for purposes of example only, not limitations. It is not exhaustive and does not limit the disclosure to the precise form disclosed.

In the claims, the words 'comprising', 'including' and 'having' do not exclude the presence of other elements or steps then those listed in a claim. The terms "a" or "an," as used herein, are defined as one or more than one. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, the terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for authenticating a user, the method comprising:

receiving, by a first server, an authorization request for a transaction from a second server, wherein the authorization request includes account identification information corresponding to an account, wherein a plurality of authentication questions each having a corresponding correct answer are associated with the account, and wherein each of the plurality of authentication questions is of Boolean type;

upon receipt of the authorization request, determining a visual impairment status of the user based on the account identification information included in the authorization request;

determining, based on the determined visual impairment status, whether to perform a first authentication method for a visually impaired user or a second authentication method for a visually abled user;

performing the first authentication method when visual impairment has been determined, the first authentication method including:

generating, by the first server, a first set of authentication questions by randomly selecting a subset of questions from the plurality of authentication questions;

transmitting, by the first server, the first set of authentication questions to a communication device by way of an interactive voice response (IVR) call;

receiving, by the first server, a first set of user-generated answers corresponding to the first set of authentication questions from the communication device;

comparing the first set of user-generated answers to their corresponding correct answers;

determining, by the first server, whether the user is an account holder of the account based on the comparison of the first set of user-generated answers to their corresponding correct answers; and processing, by the first server, the transaction, based on the determination that the user is the account holder of the account, thereby authenticating the user,
wherein the first authentication method is initiated upon the determination of the visual impairment, and it is concluded by the determination that the user is the account holder of the account, and
wherein the first authentication method is an only method of authenticating the visually impaired user, utilized upon receiving the authorization request until the processing of the transaction.

2. The method of claim 1, further comprising initiating, by the first server, the IVR call on a registered contact number linked to the account, wherein the registered contact number is associated with the communication device.

3. The method of claim 1, further comprising determining, by the first server, whether the first set of user-generated answers matches correct answers corresponding to the first set of authentication questions.

4. The method of claim 1, wherein determining, by the first server, that the user is the account holder of the account includes determining that the user is the account holder of the account based on a match between the first set of user-generated answers and correct answers corresponding to the first set of authentication questions, thereby authenticating the user.

5. The method of claim 1, further comprising:
transmitting, by the first server, a second set of authentication questions of the plurality of authentication questions to the communication device by way of the IVR call based on a mismatch between the first set of user-generated answers and correct answers corresponding to the first set of authentication questions, and wherein the second set of authentication questions is different from the first set of authentication questions; and
determining, by the first server, that the user is the account holder of the account based on a match between a second set of user-generated answers and correct answers corresponding to the second set of authentication questions, thereby authenticating the user.

6. The method of claim 1, further comprising:
determining, by the first server, whether the account holder of the account is visually impaired based on the account identification information;
wherein the first set of authentication questions is transmitted based on the account identification information.

7. A system for authenticating a user, the system comprising:
a first server comprising:
a memory configured to store a plurality of authentication questions and a correct answer corresponding to each of the plurality of authentication questions, wherein the plurality of authentication questions are associated with an account, and wherein each of the plurality of authentication questions is of Boolean type;
a processor that communicates with the memory, wherein the processor is configured to:
receive an authorization request for a transaction from a second server, wherein the authorization request includes account identification information corresponding to the account;
upon receipt of the authorization request, determine a visual impairment status of the user based on the account identification information included in the authorization request;
determine, based on the determined visual impairment status, whether to perform a first authentication method for a visually impaired user or a second authentication method for a visually abled user;
perform the first authentication method when visual impairment has been determined, wherein, according to the first method, the processor is configured to:
generate a first set of authentication questions by randomly selecting a subset of questions from the plurality of authentication questions;
transmit the first set of authentication questions to a communication device by way of an interactive voice response (IVR) call;
receive a first set of user-generated answers corresponding to the first set of authentication questions from the communication device;
compare the first set of user-generated answers to their corresponding correct answers;
determine whether the user is an account holder of the account based on the comparison of the first set of user-generated answers to their corresponding correct answers; and
process the transaction based on the determination that the user is the account holder of the account, thereby authenticating the user,
wherein the first authentication method is initiated upon the determination of the visual impairment, and it is concluded by the determination that the user is the account holder of the account, and
wherein the first authentication method is an only method of authenticating the visually impaired user, utilized upon receiving the authorization request until the processing of the transaction.

8. The system of claim 7, wherein the processor is further configured to initiate the IVR call on a registered contact number linked to the account, and wherein the registered contact number is associated with the communication device.

9. The system of claim 7, wherein the processor is further configured to determine whether the first set of user-generated answers matches correct answers corresponding to the first set of authentication questions.

10. The system of claim 7, wherein the processor being configured to determine that the user is the account holder of the account includes determining that the user is the account holder of the account based on a match between the first set of user-generated answers and correct answers corresponding to the first set of authentication questions, thereby authenticating the user.

11. The system of claim 7, wherein the processor is further configured to:
transmit a second set of authentication questions of the plurality of authentication questions to the communication device by way of the IVR call based on a mismatch between the first set of answers and correct answers corresponding to the first set of authentication questions, and wherein the second set of authentication questions is different from the first set of authentication questions; and
determine that the user is the account holder of the account based on a match between a second set of user-generated answers and correct answers corresponding to the second set of authentication questions, thereby authenticating the user.

12. The system of claim 7, wherein the processor is further configured to:

determine whether the account holder of the account is visually impaired based on the account identification information;
wherein the first set of authentication questions is transmitted based on the account identification information.

13. A non-transitory computer readable storage medium comprising computer executable instructions, which when executed by a computer, cause the computer to:
receive an authorization request for a transaction from a server, wherein the authorization request includes account identification information corresponding to an account, wherein a plurality of authentication questions each having a corresponding correct answer are associated with the account, and wherein each of the plurality of authentication questions is of Boolean type;
upon receipt of the authorization request, determine a visual impairment status of the user based on the account identification information included in the authorization request;
determine, based on the determined visual impairment status, whether to perform a first authentication method for a visually impaired user or a second authentication method for a visually abled user;
perform the first authentication method when visual impairment has been determined, the first authentication method causing the computer to:
generate a first set of authentication questions by randomly selecting a subset of questions from the plurality of authentication questions;
transmit the first set of authentication questions of the plurality of authentication questions to a communication device by way of an interactive voice response (IVR) call;
receive a first set of user-generated answers corresponding to the first set of authentication questions from the communication device;
compare the first set of user-generated answers to their corresponding correct answers;
determine whether the user is an account holder of the account based on the comparison of the first set of user-generated answers to their corresponding correct answers; and
process the transaction based on the determination that the user is the account holder of the account, thereby authenticating the user, wherein the first authentication method is an only method of authenticating the visually impaired user, utilized upon receiving the authorization request until the processing of the transaction.

14. The non-transitory computer readable storage medium of claim 13, wherein the computer executable instructions further cause the computer to initiate the IVR call on a registered contact number linked to the account, wherein the registered contact number is associated with the communication device.

15. The non-transitory computer readable storage medium of claim 13, wherein:
the computer executable instructions further cause the computer to:
determine whether the first set of user-generated answers matches correct answers corresponding to the first set of authentication questions; and
determining that the user is the account holder of the account includes determining that the user is the account holder of the account based on a match between the first set of user-generated answers and correct answers corresponding to the first set of authentication questions, thereby authenticating the user.

16. The non-transitory computer readable storage medium of claim 13, wherein the computer executable instructions further cause the computer to:
transmit a second set of authentication questions of the plurality of authentication questions to the communication device by way of the IVR call based on a mismatch between the first set of user-generated answers and correct answers corresponding to the first set of authentication questions, and wherein the second set of authentication questions is different from the first set of authentication questions; and
determine that the user is the account holder of the account based on a match between a second set of user-generated answers and correct answers corresponding to the second set of authentication questions, thereby authenticating the user.

17. The non-transitory computer readable storage medium of claim 13, wherein the computer executable instructions further cause the computer to:
determine whether the account holder of the account is visually impaired based on the account identification information;
wherein the first set of authentication questions is transmitted based on the account identification information.

* * * * *